United States Patent
Piaton

(10) Patent No.: US 8,525,377 B2
(45) Date of Patent: Sep. 3, 2013

(54) ACTUATOR WITH LOAD CELL

(75) Inventor: Jérôme Piaton, Paris (FR)

(73) Assignee: Sagem Defense Securite, Paris (FR)

( * ) Notice: Subject to any disclaimer, the term of this patent is extended or adjusted under 35 U.S.C. 154(b) by 279 days.

(21) Appl. No.: 13/132,496

(22) PCT Filed: Dec. 18, 2009

(86) PCT No.: PCT/FR2009/052611
§ 371 (c)(1),
(2), (4) Date: Jun. 2, 2011

(87) PCT Pub. No.: WO2010/072954
PCT Pub. Date: Jul. 1, 2010

(65) Prior Publication Data
US 2011/0234057 A1    Sep. 29, 2011

(30) Foreign Application Priority Data

Dec. 22, 2008 (FR) ...................... 08 58937

(51) Int. Cl.
*H02K 7/102* (2006.01)
*H02K 11/00* (2006.01)
*H02K 23/66* (2006.01)
*H02K 29/08* (2006.01)

(52) U.S. Cl.
CPC ...................... *H02K 29/08* (2013.01)
USPC ...................... 310/68 B; 310/12.14

(58) Field of Classification Search
CPC .................................... H02K 29/08
USPC .......................... 310/12.14, 68 B
See application file for complete search history.

(56) References Cited

U.S. PATENT DOCUMENTS

| 2,080,678 | A | * | 5/1937 | Van Horn et al. | ...... 310/216.108 |
| 3,269,199 | A | * | 8/1966 | Deehan et al. | ............... 74/89.25 |
| 4,505,158 | A | | 3/1985 | Maples | |
| 4,841,767 | A | * | 6/1989 | Morel | ............... 73/159 |
| 2002/0043880 | A1 | * | 4/2002 | Suzuki et al. | ................... 310/12 |
| 2008/0252161 | A1 | * | 10/2008 | Kubo | ............... 310/90.5 |
| 2008/0284256 | A1 | * | 11/2008 | Budde et al. | ................... 310/12 |
| 2009/0212644 | A1 | * | 8/2009 | Bott et al. | ................... 310/12.14 |
| 2011/0234057 | A1 | * | 9/2011 | Piaton | ............... 310/68 B |
| 2011/0254394 | A1 | * | 10/2011 | Piaton | ............... 310/77 |

FOREIGN PATENT DOCUMENTS

| EP | 1473547 A1 | 11/2004 |
| FR | 2414654 A1 | 8/1979 |
| GB | 1375203 | 11/1974 |
| WO | WO 01/38819 A1 | 5/2001 |

OTHER PUBLICATIONS

International Search Report from related PCT Application No. PCT/FR2009/052611 dated Jun. 28, 2010.

* cited by examiner

*Primary Examiner* — John K Kim
(74) *Attorney, Agent, or Firm* — Miller, Matthias & Hull LLP

(57) ABSTRACT

The actuator is of the roto-linear type and comprises a sleeve, a clevis and an operating rod which transmits the load. An electromagnetic sensor that measures and controls the load is placed inside the actuator, at the shoulder of the clevis. This sensor is associated with measurement means for processing the signals from the said winding, which winding are torus-shaped and arranged inside a field frame which is magnetically closed by an armature.

9 Claims, 2 Drawing Sheets

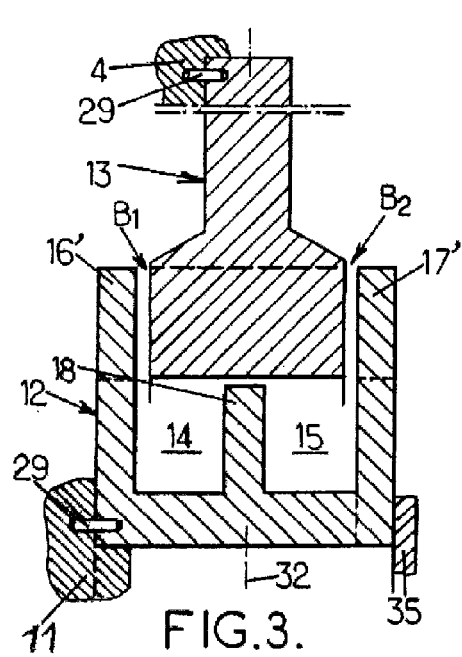
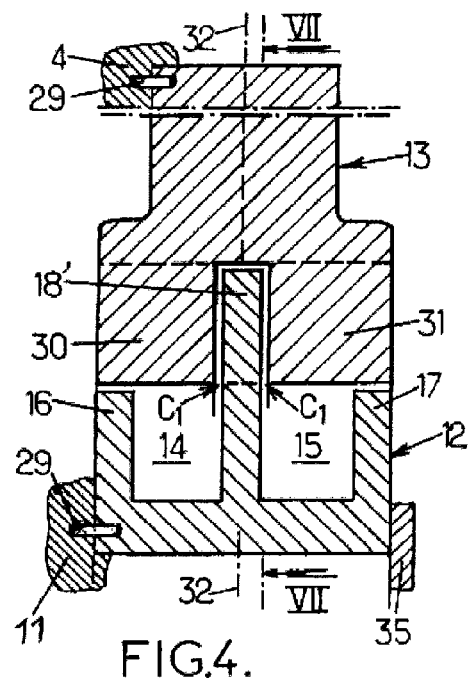
FIG.3.  FIG.4.
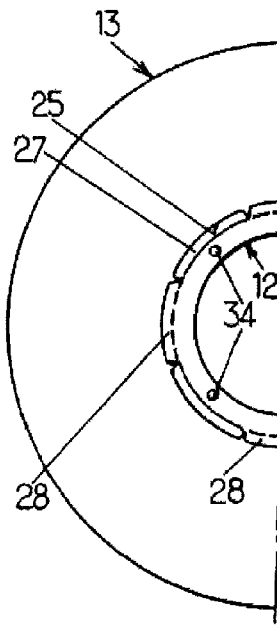
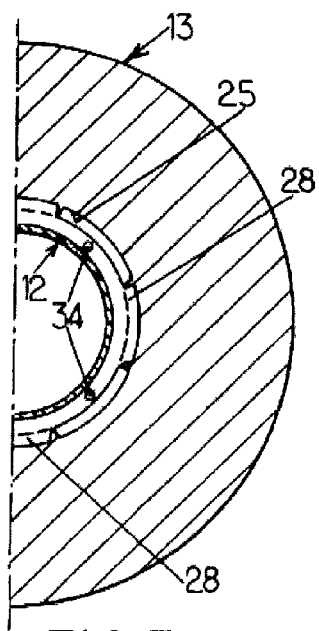
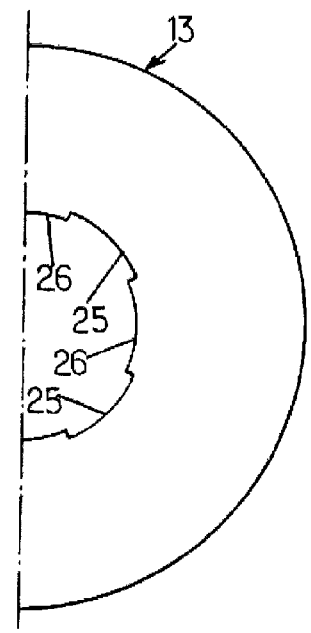
FIG.6.  FIG.7.  FIG.5.

ACTUATOR WITH LOAD CELL

CROSS-REFERENCE TO RELATED APPLICATIONS

This application is a U.S. national stage filing of International Patent Application No. PCT/FR2009/052611 filed on Dec. 18, 2009, which claims priority under the Paris Convention to French Patent Application No. 08 58937, filed on Dec. 22, 2008.

FIELD OF THE DISCLOSURE

The invention relates to an actuating device arranged to measure and/or control the loads it gives or receives.

It more particularly relates to a rotolinear actuating device with satellite rollers which comprises a system for measuring and controlling micro-displacements generated by loads applied at its clevis.

BACKGROUND OF THE DISCLOSURE

The clevis for this type of actuating device comprises, between the anchoring lug and the cylindrical sleeve, a shoulder forming an annular region which can be the site of a certain elastic deformation under the axial loads exerted between said anchoring lug and said sleeve which is coupled with the mobile rod of said actuating device. These loads in the mobile rod travel towards the sleeve by passing through the satellite rollers, through the thread insert, which acts as a nut, and through the guiding and stopping means which are placed between said nut and said sleeve.

This annular region of the clevis may comprise strain gauges, for example, which provide information on the loads applied to the device.

However, for certain applications, in the field of aeronautics for example, the use of strain gauges bonded to a region to be monitored does not guarantee reliable information throughout the service life of the device, which may be relatively long.

The invention proposes an actuator equipped with a load monitoring and control system in this annular region of its clevis; said system, in the form of a sensor, allows guaranteeing that reliable information is supplied throughout the service life of the actuating device.

In the field of aeronautics, for example, the service life of these actuating devices corresponds to the service life of the unit onto which they are installed.

This control system of the invention does not require any maintenance and also offers the advantage of being protected from certain stresses likely to damage it; it is composed of elements which are not in contact with each other.

SUMMARY OF THE DISCLOSURE

The invention therefore relates to an actuator equipped with this load control system, which consists of an electromagnetic sensor for measuring and controlling the micro-displacements which appear in the clevis of said actuator, said clevis comprising two regions of different diameters concentric to the axis of said actuator, one of said regions corresponding to the sleeve of said actuator and the other to the inner extension of the anchoring lug of said clevis, the two regions being connected to each other by a shoulder which forms an axially deformable annular region, said sensor comprising windings arranged in a field frame integrally attached to one of said concentric regions and a radially extending armature integrally attached to the other concentric region, said sensor additionally having measurement means for processing the signals issuing from said windings, said windings being torus-shaped and arranged in grooves of the field frame, with said field frame being magnetically closed by said armature.

Still according to the invention, the sensor is installed in the actuator and is in the form of a double transformer, preferably with a primary winding distributed into each transformer and a secondary winding installed in each transformer, said windings being arranged in a crown-shaped field frame centered around the axis of said actuator, said field frame having an E-shaped cross-section and a plane of symmetry which is perpendicular to said axis of the actuator, the lateral walls and central wall of said field frame being arranged with the armature to form two gaps for which the sum of the axial widths is constant for any displacement of said armature relative to said field frame.

In a preferred embodiment of the invention, the armature comprises a set of notches and the field frame of the windings also comprises a set of notches of a complementary shape, to allow the placement of said armature relative to the field frame by a bayonet twist movement, meaning an axial translation to position the two parts in the same plane of symmetry, then a rotational movement angularly displacing said armature relative to said field frame so that the projecting parts of the sets of notches are facing one another, said projecting parts defining two gaps in planes which are parallel to said plane of symmetry and which are perpendicular to the axis of the actuator.

In one embodiment, the notched armature is in the form of a washer centered around the axis and in the plane of symmetry of the field frame. This armature has an edge with a C-shaped cross-section, straddling the central wall of said field frame, and the wings of said edge are positioned to face the lateral walls of said field frame.

In one variant of the invention, the notched armature is in the form of a washer centered around the axis and in the plane of symmetry of the field frame, said armature being placed between the lateral walls of said field frame and facing the central wall of the field frame.

In another embodiment, the armature is in the form of a washer which is embedded in a field frame having an E-shaped cross-section, and this field frame is comprised of elements assembled together after said armature is put in place, said armature being placed facing the central wall of said field frame and forming two annular gaps.

In another variant, the armature comprises two symmetrical washers assembled after they are positioned on each side of the central wall projecting out from the field frame, said armature having a C-shaped cross-section at the field frame and forming two annular gaps arranged on each side of said central wall with its ends facing the lateral walls of said field frame.

Still according to the invention, the armature is integrally attached either to the outside portion of the deformable part, or to the central portion of this same deformable part.

BRIEF DESCRIPTION OF THE DISCLOSURE

The invention will be further described with the aid of the following description and the attached drawings, provided solely for illustrative purposes, in which:

FIG. 3 shows another embodiment of the sensor of the invention;

FIG. 4 shows a variant embodiment of the sensor of the invention;

FIG. 5 represents half of the washer acting as an armature for the embodiments in FIGS. 3 and 4;

FIG. 6 is a partial front view of the sensors represented in FIGS. 3 and 4;

FIG. 7 is a partial cross-sectional view along line VII-VII in FIG. 4.

DETAILED DESCRIPTION OF THE DISCLOSURE

Figure 1:
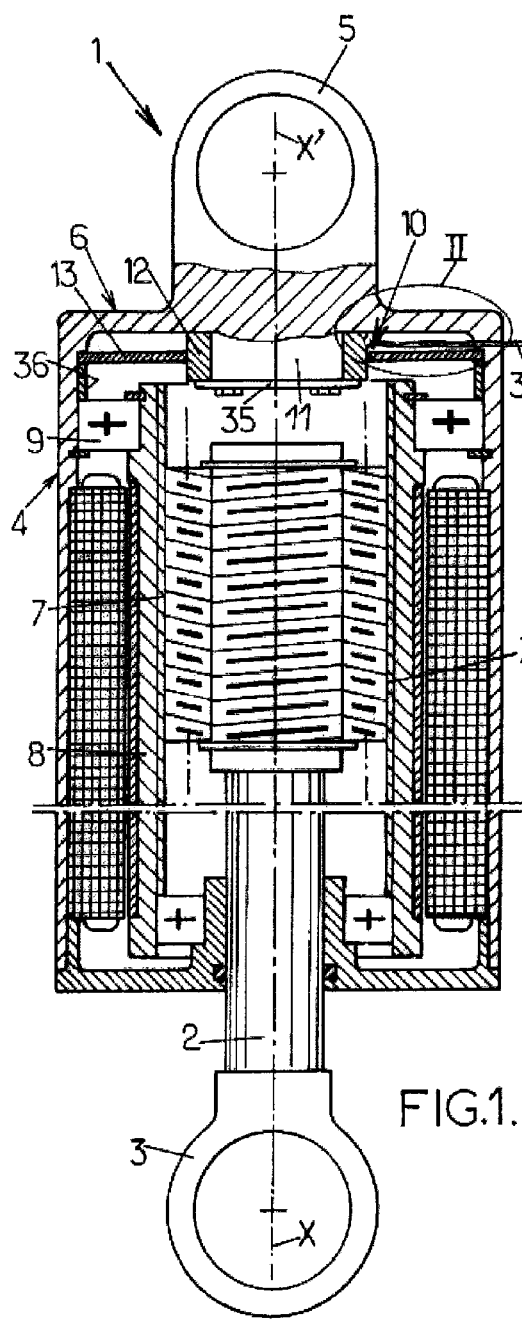
FIG. 1 is a general cross-sectional diagram of a rotolinear actuator comprising a sensor of the invention.

FIG. 1 represents a diagram of an actuating device of the type encountered, for example, in the field of aeronautics, for maneuvering flight control surfaces.

This actuating device is shown in the form of an actuator with a clevis 1, or socket, on one side, and on the other side an operating rod 2 equipped with an eye 3 at its end, and a cylindrical sleeve 4 between the clevis 1 and the eye 3.

The clevis 1 extends out from the end of the sleeve 4 and comprises a lug 5 which serves to anchor the actuating device. Between this lug 5 and said end of the sleeve 4, the clevis 1 comprises an annular shoulder 6 which forms a deformable region of said actuating device. This shoulder 6 can undergo deformation during load transmission, and from this deformation the relative micro-displacements can be observed along the axis X-X' of the actuating device, between the two regions which are concentric with this axis X-X', one of said regions corresponding to the sleeve 4 and the other to the anchoring lug 5.

These loads applied to the clevis 1 may be considerable; they are transmitted by the anchoring lug 5 of the clevis 1 and by the eye 3 of the operating rod 2 to a receiving means such as, for example, a flight control surface.

FIG. 1 also shows, for illustrative purposes, the component elements of this device which is commonly referred to as a rotolinear actuator. This rotolinear actuator comprises, between the operating rod 2 and the anchoring lug 5, satellite rollers 7 which roll on the threaded end of said rod 2 and on the threaded part inside a thread insert 8 serving as a nut. This thread insert 8 is rotationally guided by roller means and is integrally attached to the sleeve 4 on the clevis 1 side, by roller means 9 which also act as a stop and which transmit the loads between this thread insert 8 and said sleeve 4.

The annular shoulder 6 extending between the sleeve 4 and the anchoring lug 5 of the clevis 1, is subjected to elastic deformation as loads are applied to the actuator through said anchoring lug 5 and the operating rod 2.

To control and measure these loads, the actuating device comprises an integrated electromagnetic sensor 10 inside said actuating device, said sensor 10 being in contact with the two concentric regions, meaning the sleeve 4 and the anchoring lug 5, said concentric regions forming the shoulder 6 and able to move relative to each other in axial micro-displacements.

This sensor 10 is housed inside the actuating device, behind the shoulder 6, between the sleeve 4 and a cylindrical contact block 11 centered around the axis X-X' of said sleeve 4, in the extension out from the anchoring lug 5. It is similar to a positional sensor of the type referred to as LVDT, which stands for Linear Variable Differential Transformer.

The electromagnetic means which are used in this type of equipment are similar to a double transformer which translates the displacements of one of the constituent parts of said equipment into electrical signals usable by appropriate measurement means, for any displacements or even micro-displacements such as those occurring in this actuating device.

Figure 2:
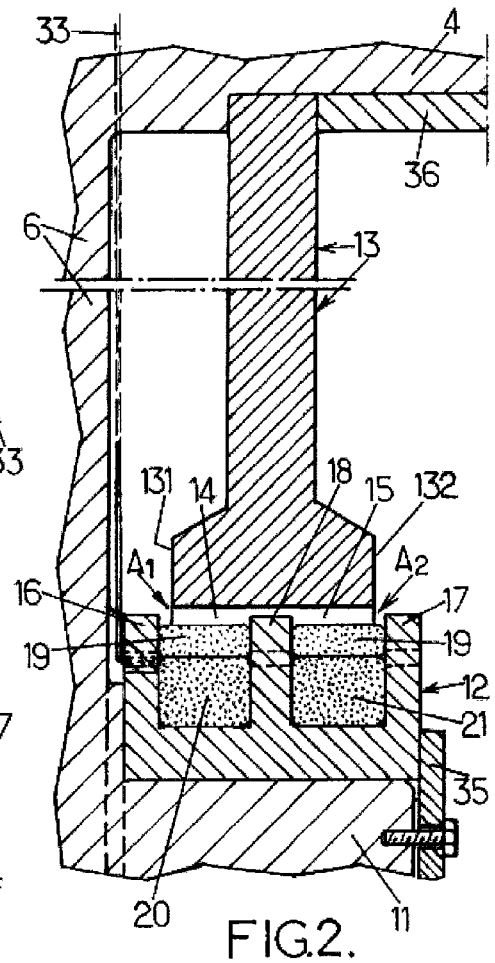
FIG. 2 represents a partial half-sectional view, showing more details of the component elements of the sensor in one embodiment of the invention.

The sensor 10 is detailed in FIG. 2 in a first possible embodiment. It is in the form of a double transformer comprising a crown-shaped field frame 12 with an E-shaped cross-section and a ring-shaped ferromagnetic armature 13. The field frame 12 is, for example, held immobile on the cylindrical contact block 11 and the armature 13 is, in this case, held immobile on the inner wall of the sleeve 4.

The field frame 12 comprises two sets of distributed windings in the two grooves 14 and 15 delimited by lateral walls 16, 17 and by a wall 18 centered between said lateral walls 16 and 17. These two grooves 14 and 15 each accept two windings: the same primary winding 19, and a secondary winding 20 arranged in the groove 14 and another secondary winding 21 arranged in the groove 15.

The primary winding 19 is supplied with excitation current and, when the core 13 moves, it channels the magnetic flux and modifies the currents induced in each secondary winding; these currents are translated into signals which can be processed by electronic means to control and analyze the value of the displacements and determine the value of the loads applied to the shoulder 6 of the clevis 1.

The armature 13 is sized to close the magnetic circuit which enables the two transformers to operate.

In the embodiment represented in FIG. 2, the signals transmitted by the secondary windings 20 and 21 correspond to a variation in distance between the lateral faces 131, 132 of the armature 13 and the respective ends of the lateral walls 16 and 17 of the field frame 12.

The axial gap between the field frame 12 and the faces 131 and 132 of the armature 13 is illustrated in the figure by A1 and A2 respectively; the sum of these two gaps A1 and A2 is a constant value when the armature 13 remains within the form of the field frame 12.

In fact, the relative displacements are very small between the sleeve 4 and the anchoring lug 5, along the axis X-X' of the actuator; they are, for example, on the order of ±0.2 mm to each side of the radial plane of symmetry of the field frame 12, said radial plane being perpendicular to said axis X-X'.

FIG. 3 represents another embodiment of the sensor of the invention. This sensor comprises a crown-shaped field frame 12 with an E-shaped cross-section defining two transformers similarly to above. This field frame 12 is attached, by appropriate mechanical means detailed below, to the cylindrical contact block 11, and it comprises two lateral walls 16', 17', and a central wall 18.

The lateral walls 16' and 17' of the crown project beyond from the central wall 18 and surround the armature 13, defining annular gaps B1 and B2. The inside edge of the armature 13 is facing the central wall 18.

To position the armature 13 between the lateral walls 16' and 17' of the field frame 12, as represented in FIG. 3, said field frame 12 can comprise juxtaposed elements which are assembled after the armature 13 is placed between the walls 16' and 17'.

Another solution, as represented in FIGS. 5 and 6, may consist of creating notches on the edge of the armature 13, and complementary notches on the lateral walls 16' and 17' of the field frame 12.

The armature 13 comprises indentations 25 which correspond to the projections 26 from the field frame 12, and conversely, said field frame 12 comprises indentations 27 which correspond to the projections 28 from said armature 13. In this manner, the armature 13 can engage with the field frame 12 in a position facing the central wall 18. This placement occurs by a bayonet twist movement, meaning an axial movement followed by a rotational movement of the armature 13 relative to the field frame 12, or the reverse, to match up their respective projections 26 and 28, with the gaps B1 and B2 located between them.

Indexing means are necessary to maintain the field frame 12 and the armature 13 in position. These indexing means may consist of a pin 29, as represented in FIG. 3.

In the embodiment represented in FIG. 4, it is the central wall 18' of the field frame 12 which projects further than the lateral walls 16 and 17. The active portion of the armature 13 has a C-shaped cross-section which fits together with the projecting portion of said central wall 18' of the field frame 12. The two wings 30 and 31 of the armature 13 are facing the lateral walls 16 and 17 of the field frame 12, and with the central wall 18' they define two annular gaps C1 and C2 which have the same characteristics as above: the sum of the thicknesses of these two gaps C1 and C2 is constant for any position of the armature 13 relative to the wall 18' of the field frame 12.

As above, to position the armature 13 relative to the field frame 12, meaning to place them in the same plane of symmetry 32, said armature 13 can consist of two symmetrical parts assembled together in said plane of symmetry 32 after their placement around the central wall 18' of said field frame 12.

Another solution, as represented in FIGS. 5 and 7, may also consist of creating notches on each wing 30 and 31 of the armature 13, and complementary notches on the central wall 18' of the field frame 12.

The armature comprises, in each of its wings 30 and 31, aligned axial indentations 25 which correspond to the projections 26 from the field frame 12 and, conversely, said field frame 12 comprises indentations 27 which correspond to the projections 28 from the wings 30 and 31 of the armature 13. In this manner, the armature 13 can engage with the field frame 12 and straddle the central wall 18'. This placement occurs by a bayonet twist motion, meaning an axial movement followed by a rotational movement of the armature 13 relative to the field frame 12, or the reverse, to match up their respective projections, with the gaps C1 and C2 located between them.

Here again, indexing means are necessary to maintain the field frame 12 and the armature 13 in their relative positions.

These means consist of a simple pin 29, as represented in FIGS. 3 and 4.

The field frame 12 and the armature 13 may be respectively installed on the cylindrical contact block 11 and on the sleeve 4, or on the sleeve 4 and on the cylindrical contact block 11.

In the case where an armature 13 is integrally attached to the sleeve 4 and a field frame 12 is integrally attached to the contact block 11, as is the case in the various figures, the wires 33 of the windings 19, 20, and 21, are arranged between the inside face of the shoulder 6 and the armature 13 of the sensor. As represented in FIGS. 3 and 4, the wires 33 exit at the periphery of the field frame 12. These wires 33 may pass through openings 34, or indentations, which are in the non-magnetically active part(s) of the field frame 12; these openings 34, visible in FIGS. 6 and 7, are arranged in the middle portion of the indentations 27 of said field frame 12.

The field frame 12 is preferably attached to the central contact block 11 by a washer 35 holding it in place, said washer 35 being, for example, in the form of a spring, attached by a screw to said contact block 11. This washer 35 may also serve to index the position of the field frame 12 and provide an alternative to the possibility of indexing by a pin 29 as detailed above.

The armature 13 is, for example, held immobile by a ring 36 which also acts as support for the roller means 9 acting as a guide and stop.

The invention claimed is:

1. A roto-linear actuator of the type comprising a sleeve and a clevis at one of the ends of said sleeve, said sleeve receiving the loads transmitted and/or received by the operating rod, wherein it comprises a sensor for measuring and controlling the micro-displacements which appear between two concentric regions of different diameters, one of which corresponds to said sleeve and the other to the inner extension of the anchoring lug of said clevis, said regions being connected by an axially deformable annular region which forms the shoulder of said clevis, said sensor comprising windings arranged in a field frame integrally attached to one of said concentric regions and a radially extending armature integrally attached to the other concentric region, said sensor additionally comprising measurement means for processing the signals issuing from said windings, said windings being torus-shaped in said field frame which is magnetically closed by said armature.

2. A roto-linear actuator according to claim 1, wherein it comprises a sensor which is in the form of a double transformer, preferably with a primary winding distributed into each transformer and a secondary winding in each of said transformers, said windings being arranged in a crown-shaped field frame centered around the axis X-X' of the sleeve, said field frame having an E-shaped cross-section and a plane of symmetry which is perpendicular to said axis X-X' and said field frame being arranged so that its lateral walls and its central wall form, with the armature, two gaps for which the sum of the axial widths is a constant value for any displacement of said armature relative to said field frame.

3. A roto-linear actuator according to claim 2, wherein it comprises a sensor for which the armature comprises a set of notches and the field frame also comprises a set of notches of a shape complementary to those of said armature, to allow the placement of said armature relative to said field frame by means of a bayonet twist movement, meaning an axial translation to position the two parts in the same plane of symmetry, then a rotational movement angularly displacing said armature relative to said field frame so that the projecting parts of said sets of notches are facing one another, said projecting parts defining two annular gaps arranged in planes parallel to said plane of symmetry.

4. A roto-linear actuator according to claim 3, wherein the notched armature is in the form of a washer centered around the axis X-X' of the sleeve and in the plane of symmetry of the field frame, said armature comprising a edge having a C-shaped cross-section and straddling the central wall of said field frame, the wings of said edge positioned to face the lateral walls of said field frame.

5. A roto-linear actuator according to claim 3, wherein the notched armature is in the form of a washer centered around the axis X-X' of the sleeve, in the plane of symmetry of the field frame, said armature being placed between the lateral walls of said field frame and facing the central wall of the field frame.

6. A roto-linear actuator according to claim 2, wherein the armature is in the form of a washer which is embedded in a field frame having an E cross-section, and said field frame is comprised of elements assembled together after said armature is put in place, said armature being placed facing the central wall of said field frame and with it forming two annular gaps B1 and B2.

7. A roto-linear actuator according to claim 2, wherein the armature comprises two symmetrical washers assembled after they are positioned on each side of the central wall projecting out from the field frame, said armature having a C-shaped cross section at said field frame and forming two annular gaps C1 and C2 arranged on each side of said central wall with its wings facing the lateral walls of said field frame.

8. A roto-linear actuator according to claim 1, wherein the armature is integrally attached to the sleeve.

9. A roto-linear actuator according to claim 1, wherein the armature is integrally attached to the central contact block.

* * * * *